(12) United States Patent
Maruyama et al.

(10) Patent No.: US 7,404,584 B2
(45) Date of Patent: Jul. 29, 2008

(54) SEAT APPARATUS FOR VEHICLES

(75) Inventors: Kazuyuki Maruyama, Saitama (JP); Yoshiyuki Matsumoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 11/472,440

(22) Filed: Jun. 22, 2006

(65) Prior Publication Data

US 2006/0290186 A1 Dec. 28, 2006

(30) Foreign Application Priority Data

Jun. 24, 2005 (JP) ............................. 2005-185124

(51) Int. Cl.
*B60N 2/06* (2006.01)

(52) U.S. Cl. ............ 296/65.08; 296/65.15; 297/344.13; 701/49

(58) Field of Classification Search .............. 296/65.05, 296/65.08, 65.13–65.15, 65.18; 297/344.1, 297/344.12, 344.13, 344.14; 701/49
See application file for complete search history.

(56) References Cited

U.S. PATENT DOCUMENTS

| | | | | |
|---|---|---|---|---|
| 2,210,863 A | * | 8/1940 | Whedon | 297/329 |
| 2,612,208 A | * | 9/1952 | Rhodes | 248/430 |
| 2,712,346 A | * | 7/1955 | Sprinkle | 297/344.12 |
| 2,964,093 A | * | 12/1960 | Lohr et al. | 248/429 |
| 3,007,668 A | * | 11/1961 | Dall | 248/429 |
| 4,482,188 A | * | 11/1984 | Tilly et al. | 297/473 |
| 4,944,555 A | * | 7/1990 | Brusasco | 297/330 |
| 5,251,864 A | * | 10/1993 | Itou | 248/588 |
| 5,812,399 A | * | 9/1998 | Judic et al. | 701/49 |
| 2006/0206251 A1 | * | 9/2006 | Barker et al. | 701/49 |

FOREIGN PATENT DOCUMENTS

JP 07-164934 6/1995

* cited by examiner

*Primary Examiner*—Dennis H Pedder
(74) *Attorney, Agent, or Firm*—Squire, Sanders & Dempsey L.L.P.

(57) ABSTRACT

Disclosed is a seat apparatus for a vehicle, which has the functions of supporting a seat main body being placed on a floor and behind pedals in the vehicle in such a way that the seat main body is movable forward, backward, upward and downward and that the seat main body is made higher in height as it moves forward, and adjusting a position of the seat main body forward, backward, upward and downward in a predetermined adjusting orbit, so that the position fits different builds of drivers. Furthermore, the adjusting orbit is determined based on hip points of the drivers, and the hip points are set on the condition that a viewpoint and heels of the drivers are fixed.

8 Claims, 8 Drawing Sheets

SEAT APPARATUS FOR VEHICLES

CROSS-REFERENCE TO RELATED APPLICATIONS

This application claims the benefit of Japanese Patent Application 2005-185124 filed on Jun. 24, 2005, the disclosure of which is incorporated herein by reference.

BACKGROUND OF THE INVENTION

1. Field of the Invention

The present invention relates to a seat apparatus for vehicles. More specifically, the present invention pertains to a seat apparatus for vehicles which gives a driver a broader view and which allows the driver to push pedals such as a brake without much effort. Further more specifically, the present invention is directed to a seat apparatus for vehicles that permits a driver to adjust a seat forward, backward, upward and downward in accordance with his or her build.

2. Description of the Related Art

In a typical vehicle, a driver's seat is installed on the floor and behind the pedals such as the brake. In addition, the seat is supported by a seat slide unit in such a way to be movable forward and backward. This seat slide unit is composed of a pair of lower rails and a pair of upper rails. The lower rails are fixed to the floor, parallel to each other, with extending from the front to the back. The upper rails are secured to the lower surface of the seat cushion in alignment with the lower rails, and slidably engage with the lower rails. Furthermore, the upper rails are locked by stoppers, etc. of the lower rails. With this seat slide unit, the seat can be adjusted in accordance with the build of a driver. The driver's seat is also supported by a vertical adjusting mechanism. With this mechanism, the height of the driver's seat can be adjusted.

In order to move the seat forward, backward, upward and downward in accordance with the build of a driver, a seat apparatus for vehicles disclosed in Japanese Unexamined Patent Application Publication H07-164934 has been proposed. This seat apparatus is equipped with inclined rail slides under the seat. As the seat travels forward on the rail slides, the seat is made higher. With this apparatus, the seat can be adjusted forward, backward, upward and downward simultaneously.

On the other hand, an appropriate hip point (or seat position), at which the driver can have a broad front view and press pedals such as the brake without effort, is determined depending on the build of a driver. Moreover, the relationship between the build and the hip point of a driver is not typically linear but curved.

The typical seat apparatus travels the seat in a linear orbit. As a result, the viewpoint of a driver may deviate from the appropriate one. To illustrate, when a driver on the seat has a tiny build, his or her viewpoint may be too low. In this case, it is hard for the driver to view the front area, especially the area in front of and beneath the vehicle.

Furthermore, this apparatus can also move pedals forward, backward, upward and downward in accordance with a driver's build, most especially the length of his or her legs. This enables the driver to press the pedals surely without effort. However, such an adjustment can be troublesome.

Taking the above disadvantages into account, the present invention has been conceived. The present invention has been contrived as a result of the intense research and study made by the inventors. It is also based on the fact that the relationship between a driver's build and his or her hip point is curved. An object of the present invention is to provide a seat apparatus for vehicles which enables a seat to be adjusted precisely and appropriately in accordance with a driver's build, thus giving the driver a broader front view as well as allowing him or her to press pedals without much effort.

SUMMARY OF THE INVENTION

According to a first aspect of the present invention, there is provided, a seat apparatus for a vehicle, comprising the functions of:

supporting a seat main body being placed on a floor and behind pedals in the vehicle in such a way that the seat main body is movable forward, backward, upward and downward and that the seat main body is made higher in height as it moves forward; and adjusting a position of the seat main body forward, backward, upward and downward in a predetermined adjusting orbit, so that the position fits different builds of drivers, wherein the adjusting orbit is determined based on hip points of the drivers, and the hip points are set on the condition that a viewpoint and heels of the drivers are fixed.

According to a second aspect of the present invention, there is provided, the seat apparatus according to the first aspect, further comprising:

a link unit for supporting the seat main body parallel to the floor in such a way that the seat main body is movable upward and downward;

a seat slide unit for supporting the seat main body through the link unit in such a way that the seat main body is movable forward and backward; and a guide unit for moving the seat main body in the adjusting orbit by varying a height of the link unit in response to the movement of the seat slide unit.

According to a third aspect of the present invention, there is provided, a vehicle equipped with the seat apparatus according to the first or second aspect.

With the seat apparatus for vehicles according to the present invention, the seat main body can be traveled to the hip point of a driver by moving the seat main body forward, backward, upward and downward. This makes it possible to give a broader front view to a driver of certain build and to allow the driver to press the pedals without much effort. Consequently, a mechanism for adjusting the pedals forward, backward, upward and downward, which is used in conventional seat apparatuses, are unnecessary. This leads to the cost reduction in vehicle.

Other aspects, features and advantages of the present invention will become apparent upon reading the following specification and claims when taken in conjunction with the accompanying drawings.

BRIEF DESCRIPTION OF THE DRAWINGS

For more complete understanding of the present invention and the advantages hereof, reference is now made to the following description taken in conjunction with the accompanying drawings wherein.

DETAILED DESCRIPTION OF THE EXEMPLARY EMBODIMENTS OF THE INVENTION

A detailed description will be given below, of seat apparatuses for vehicles according to first and second embodiments of the present invention, with accompanying drawings.

(First Embodiment)

Figure 1:
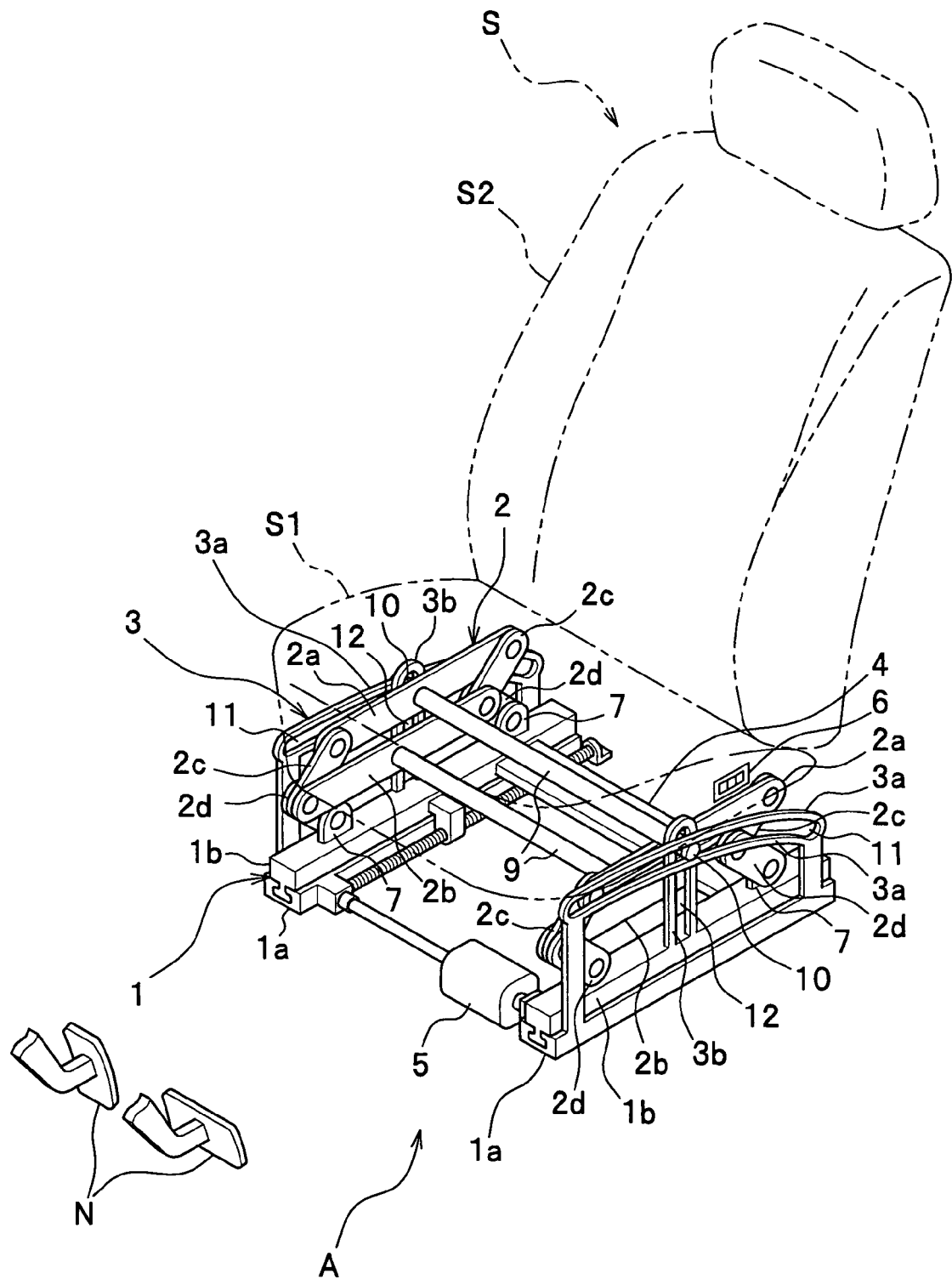
FIG. 1 is a perspective view depicting a seat apparatus for vehicles according to a first embodiment of the present invention.
Figure 2A:
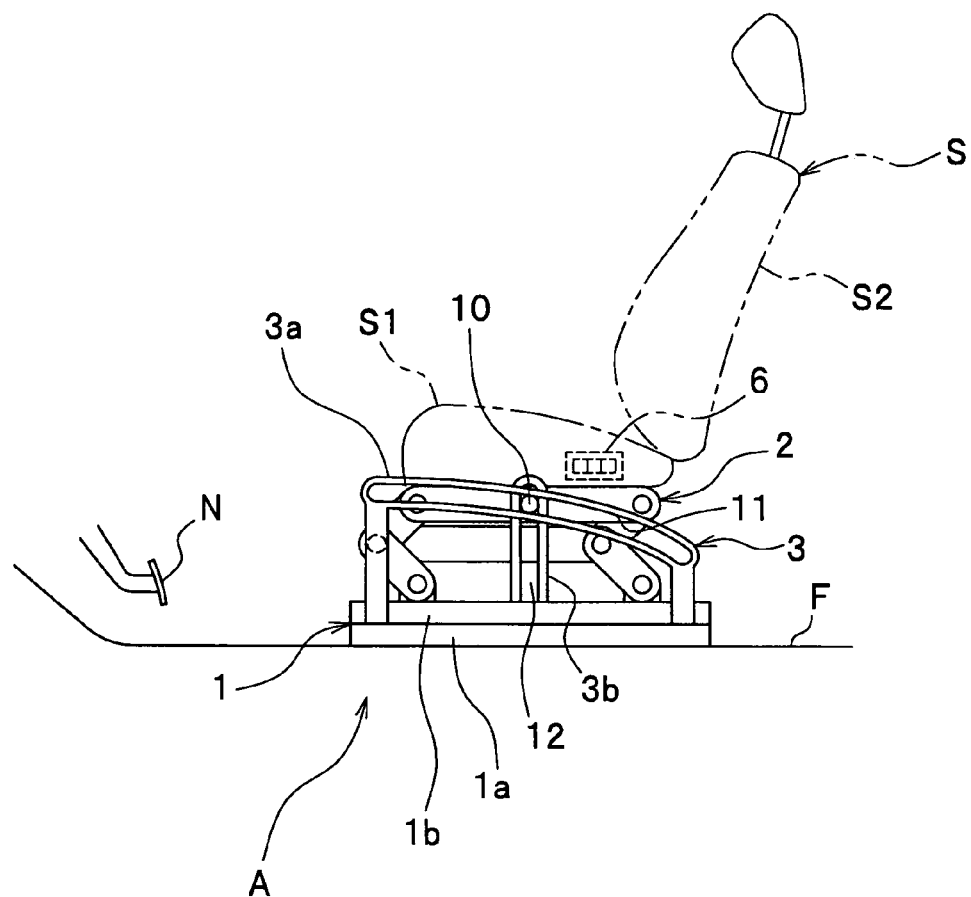
FIG. 2A is a side view depicting the seat apparatus for vehicles.
Figure 2B:
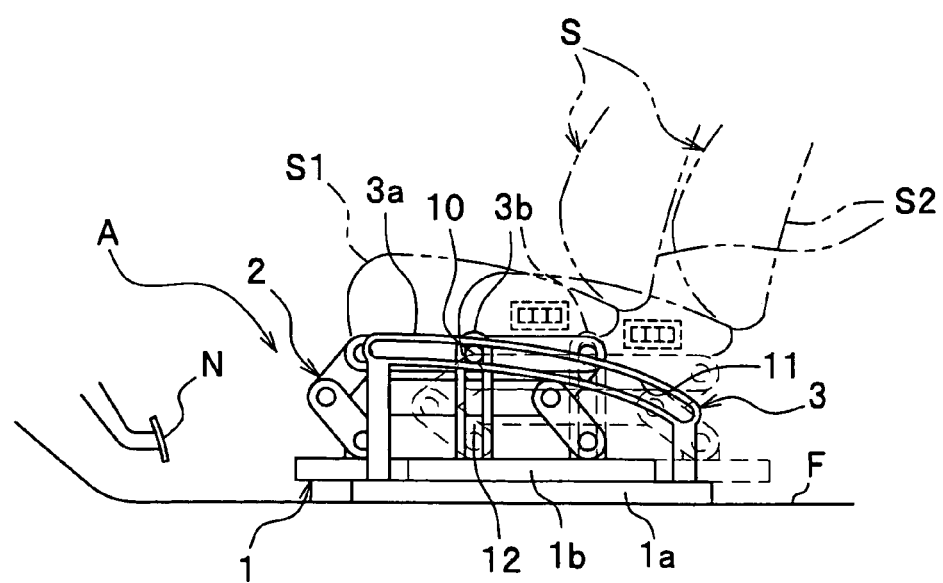
FIG. 2B is a side view depicting a seat main body having moved forward.

Referring to FIGS. 1, 2A and 2B, a seat apparatus for vehicles A (refer to a "seat apparatus A" thereafter) supports a seat main body S to move forward, backward, upward and downward. As the seat main body S travels forward, the seat position is made higher. The seat main body S includes a seat cushion S1 and a seat back S2, and it is placed on a floor F through the seat apparatus A. In front of the seat main body S, pedals N including a brake, accelerator and clutch are arranged.

Figure 9:
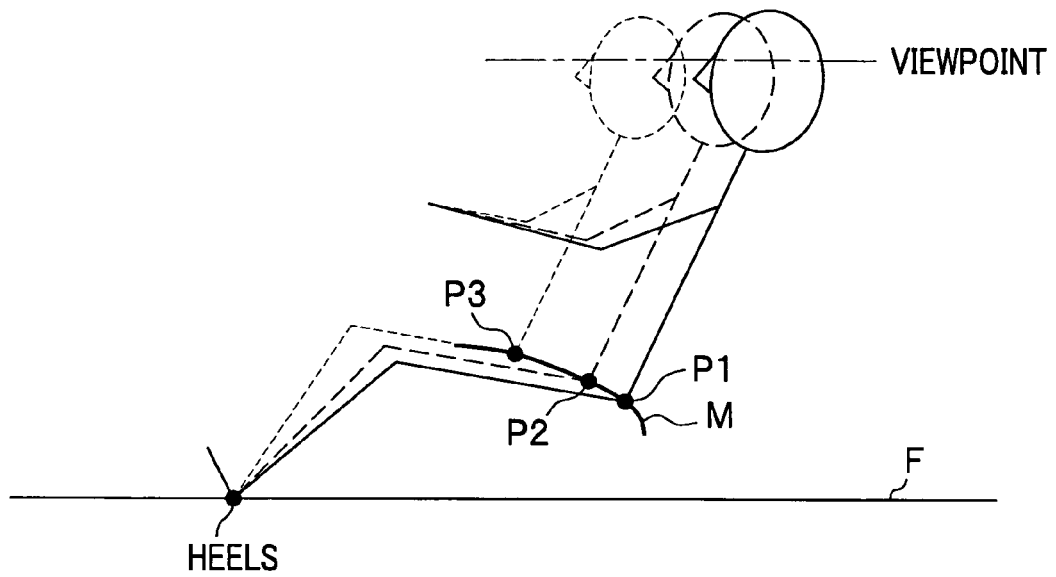
FIG. 9 is a view for explaining a curved shape of an adjusting orbit traced by the build and the hip point of a driver.

The seat apparatus A moves the seat main body S to hip points P1, P2 and P3 (see FIGS. 2A, 2B and 9). In other words, the seat apparatus A adjusts the seat main body S such that a driver of a certain build can make an appropriate pose. Specifically, this adjustment is done by moving the seat main body S in an adjusting orbit M (see FIG. 9) as will be described later.

Note that in the first and second embodiments of the present invention, "forward" is defined as in the direction in which the vehicle will proceed, "backward" is defined as in the direction opposite to forward, "upward" is defined as in the direction toward the roof of the vehicle, and "downward" is defined as in the direction toward the floor of the vehicle.

[Seat Apparatus]

Referring to FIG. 1, the seat apparatus A includes a seat slide unit 1, a link unit 2 and a guide unit 3. The seat slide unit 1 supports the seat main body S in such a way to move forward and backward. The link unit 2 is coupled to the seat slide unit 1 and supports the seat main body S, parallel to the floor. The guide unit 3 is coupled to the seat slide unit 1, and it supports the link unit 2 in the adjusting orbit M, parallel to the floor, when the seat slide unit 1 is slid.

[Seat Slide Unit]

Figure 3:
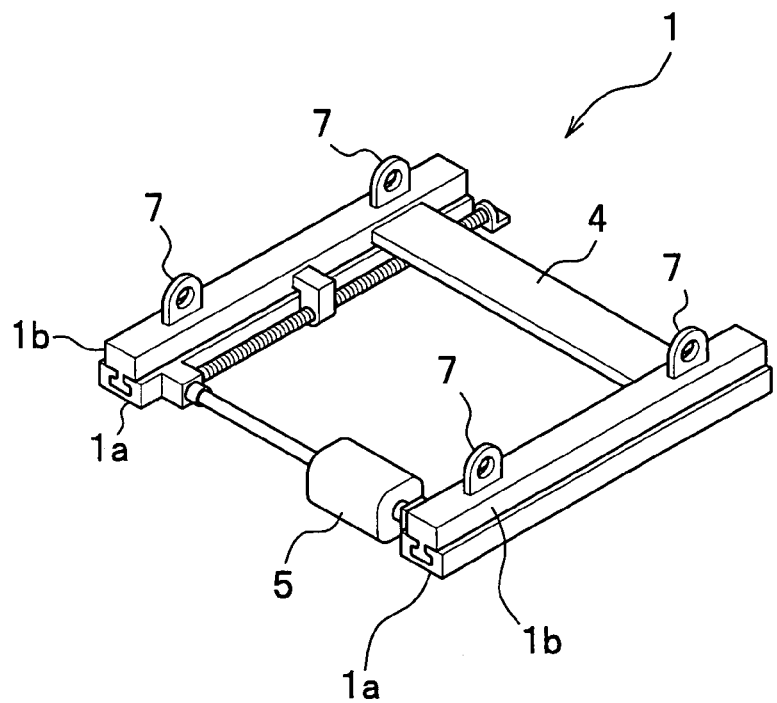
FIG. 3 is a perspective view depicting a seat slide unit of the seat apparatus for vehicles.

Referring to FIG. 3, the seat slide unit 1 includes a vehicle body fixture unit and a movable unit. The vehicle body fixture unit is composed of a couple of lower rails 1a and 1a arranged parallel to each other on the floor F with extending forward and backward. Meanwhile, the movable unit is composed of a couple of upper rails 1b and 1b slidably engaging with the lower rails 1a and 1a. These upper rails 1b and 1b are coupled to one another by a link member 4, so that they slidably move forward and backward together.

Note that although the number of the link member 4 is one in this embodiment, the present invention is not limited thereto. Alternatively, it may be an arbitrary number. In addition, the vehicle body fixture unit and the movable unit may not be limited to a rail structure composed of the upper and lower rails.

As shown in FIG. 3, the seat slide unit 1 is provided with a seat sliding motor 5 (called a "motor" thereafter). This motor slidably moves the upper rails 1b and 1b forward and backward in response to the ON/OFF operation of a switch 6.

Figure 4:
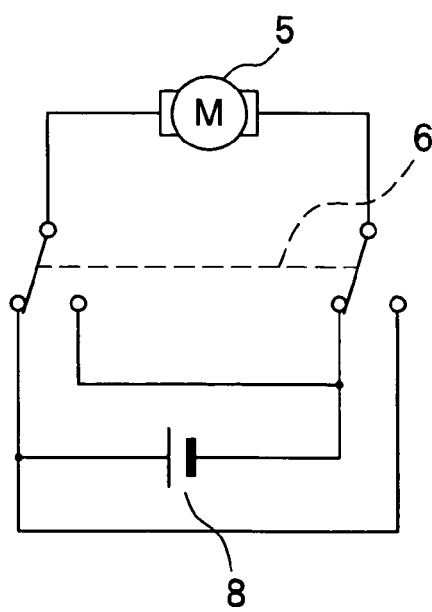
FIG. 4 is a circuit diagram for connecting a motor and a power source by a switch, when a seat slide unit is of an electric driven type.

Referring to FIG. 4, the switch 6 connects/disconnects the motor 5 and a power source 8. For example, when the switch 6 is pressed down forward, the motor 5 rotates clockwise, thereby moving the seat main body S forward. Meanwhile, when the switch 6 is pressed down backward, the motor 5 rotates counterclockwise, thereby moving the seat main body S backward. In addition, when the switch 6 is made in a neutral position, the seat main body S is locked. Alternatively, the seat main body S may be moved and locked by hand, instead of electric power. To illustrate, by rotating a lever manually in a predetermined direction, the seat main body S may be unlocked, and the upper and lower rails may be set free. Furthermore, after the seat main body S is moved manually, the seat main body S may be locked by releasing the hand from the lever.

[Link Unit]

Figure 5:
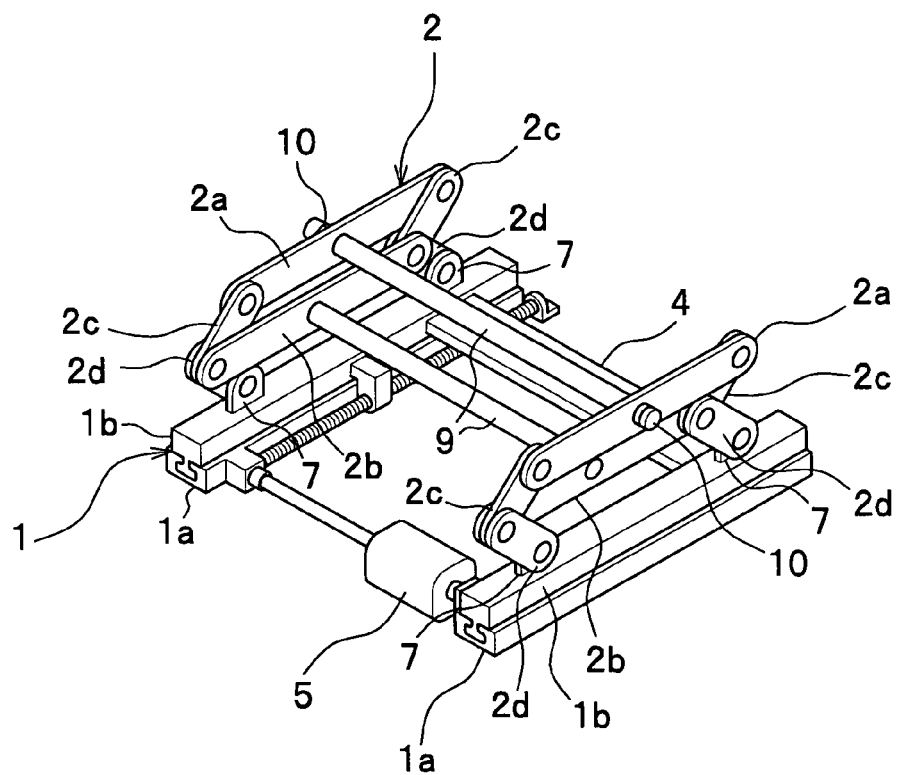
FIG. 5 is a perspective view depicting a link unit on the seat slide unit.

Referring to FIG. 5, the link unit 2 includes a pair of upper links 2a and 2a, a pair of lower links 2b and 2b and joint links 2c, 2c, 2c and 2c, and it forms a substantial parallelogram shape. The upper links 2a and 2a are provided below the seat cushion S1 of the seat main body S. The lower links 2b and 2b are below the upper links 2a and 2a and away therefrom by a predetermined distance. Each pair of joint links 2c and 2c couples the lower links 2b and 2b to the upper links 2a and 2a.

The link unit 2 includes support links 2d, 2d, 2d and 2d. One end of each support link 2d is coupled to a corresponding one of the lower links 2b and 2b, and the other end is coupled to a corresponding one of hinge portions 7, 7, 7 and 7 mounted on the upper rail 1b.

Due to this configuration, the link unit 2 can change its height on the upper rails 1b and 1b by using the support links 2d and 2d. Furthermore, the link unit 2 can change the height of the seat cushion S1 while keeping the substantial parallelogram shape.

As shown in FIG. 5, the upper links 2a and 2a or the lower links 2b and 2b are coupled to each other through the link member 9 such as a bar member or a pipe member. Consequently, they can move vertically in relation to one another.

Moreover, the link unit 2 includes pin members 10 on the upper links 2a and 2a. Each pin member 10 is inserted into both a lateral guide aperture 11 of a lateral guide member 3a and a vertical guide aperture 12 of a vertical guide member 3b.

[Pin Member]

The pin members 10 are slidably inserted into the lateral guide apertures 11 and 11 formed to have the adjusting orbit M (see FIG. 9). This enables the height of the link unit 2 to be variable.

Figure 6:
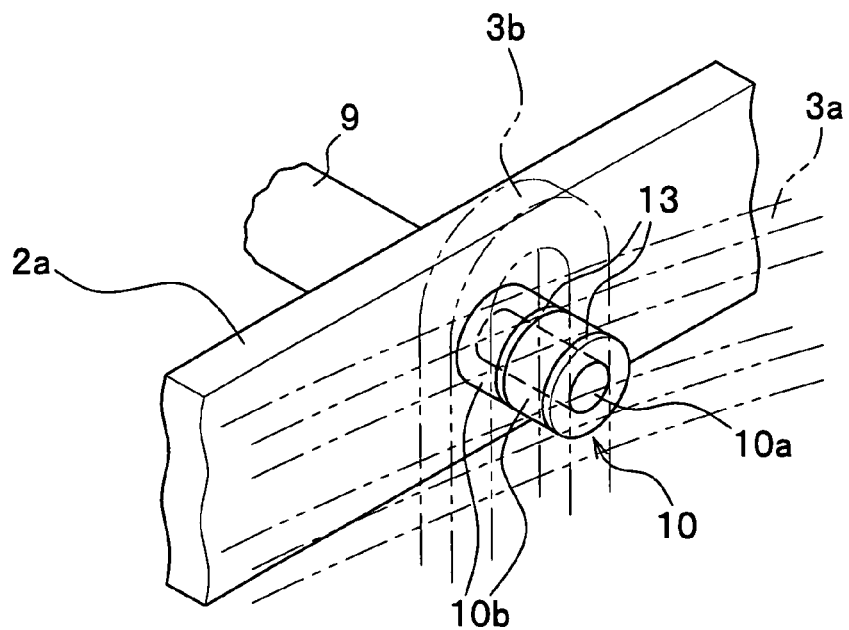
FIG. 6 is an enlarged view depicting a pin member of the link unit.

Referring to FIG. 6, each pin member 10 includes a pin portion 10a and rotated portions 10b and 10b wrapped around the pin member 10.

Each pin portion 10a protrudes from the substantial center of the upper link 2a by a predetermined distance (see FIG. 5). In addition, the pin portion 10a is formed on the link member 9 that couples the upper links 2a and 2a. Note that the position of the pin portion 10a is not limited to the center of the upper links 2a and 2a. Alternatively, the position may be shifted from the center.

The rotated portions 10b and 10b are arranged away from each other so as to rotate in contact with the inner surfaces of the lateral guide aperture 11 and the vertical guide aperture 12. As shown in FIG. 6, the rings 13 and 13 are arranged between the rotated portions 10b and 10b and on the end of the pin portion 10a, respectively, with their rotation being locked. The rings 13 and 13 are in contact with both the lateral guide aperture 11 and the vertical guide aperture 12, respectively. Moreover, the rings 13 and 13 permit the rotated portions 10b and 10b to be rotated independently and prevents the rotated portions 10b and 10b from being removed.

Although not shown, the rotated portions 10b and 10b have bearings in order to decrease friction resistance between the rotated portion 10b and the ring 13. This enables the pin member 10 to be rotated smoothly.

[Guide Unit]

Figure 7:
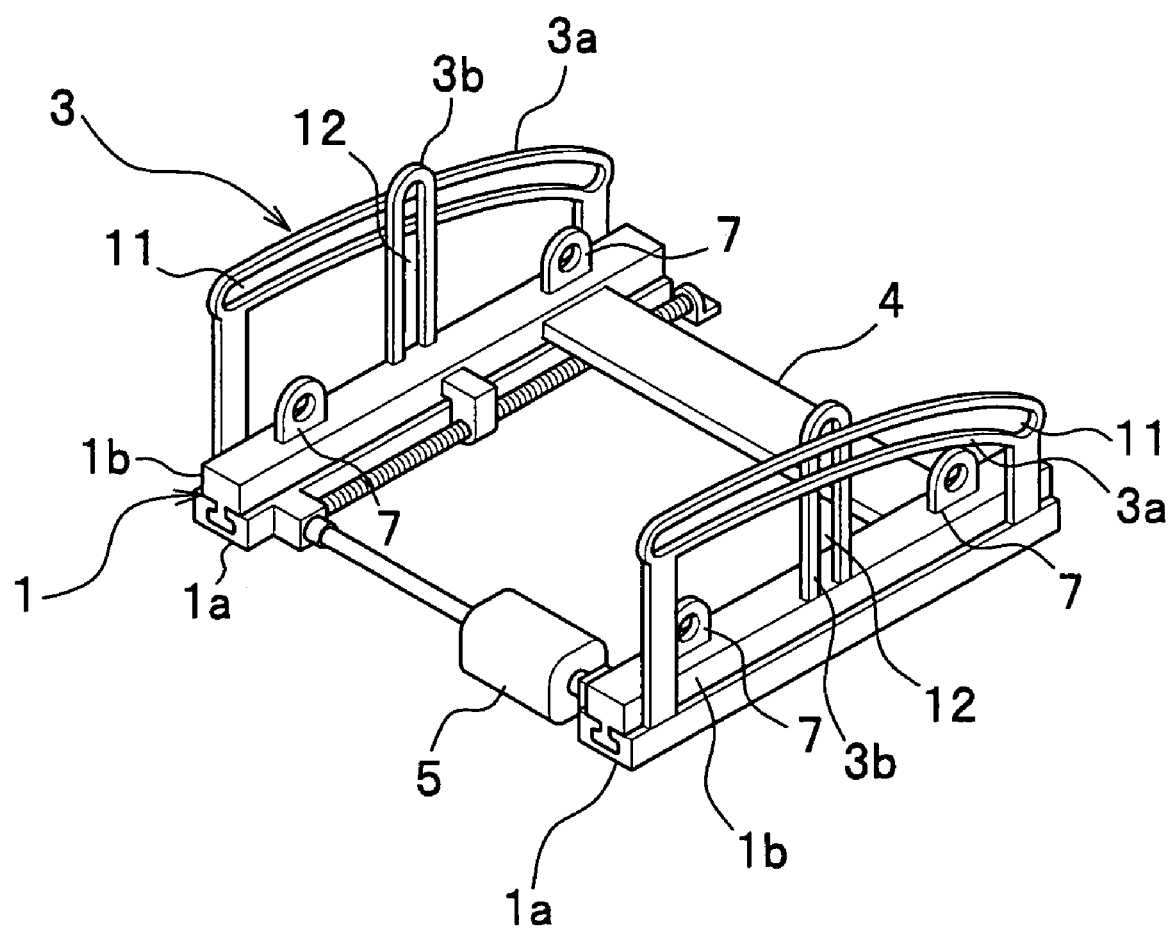
FIG. 7 is a perspective view depicting a guide unit placed on the seat slide unit.

Referring to FIG. 7, the guide unit 3 includes the lateral guide members 3a and 3a and the vertical guide members 3b and 3b. The lateral guide member 3a has substantially the same length as the lower rail 1a, and has a vertical length to cover an upper adjustable limit of the seat main body S. Furthermore, the lateral guide member 3a is erected on the lower rail 1a.

The lateral guide member 3a has the curve-shaped lateral guide aperture 11 forming the adjusting orbit M (see FIG. 9).

The upper adjustable limit of the seat main body S is the highest position of the seat position within a range where the seat main body S is movable.

As shown in FIG. 7, the vertical guide member 3b is high enough to reach the upper adjustable limit of the seat main body S. The vertical guide member 3b stands on the upper rail 1b in an upright position, and the vertical guide aperture 12 is formed to have substantially the same length as the vertical guide member 3b.

Owing to the above configuration, both the lateral guide aperture 11 of the lateral guide member 3a and the vertical guide aperture 12 of the vertical guide member 3b form a cross shape, as shown in FIG. 7. The vertical guide member 3b moves with crossing the lateral guide member 3a, when the upper rail 1b is slid. The pin member 10 is fitted into both apertures 11 and 12 at the location where the lateral guide aperture 11 and the vertical guide aperture 12 intersect each other (see FIGS. 1, 2A and 2B). Accordingly, the pin member 10 moves within the lateral guide aperture 11, while the vertical guide members 3b and 3b travels forward. In this case, as the lateral guide aperture 11 moves forward in the adjusting orbit M, its position is made higher. Thus, the height of the link unit 2 is made higher by sliding the pin members 10 forward in the adjusting orbit M. Both the height of the link unit 2 (attached to the pin members 10) and the position of the seat cushion S1 (of the seat main body S mounted on the link unit 2) always correspond to a location where the lateral guide aperture 11 and the vertical guide aperture 12 intersect each other (see FIGS. 2A and 2B).

(Second Embodiment)

Next, a detailed description will be given below, of a seat apparatus for vehicles according to a second embodiment of the present invention. A seat apparatus of a second embodiment is similar to that of the first embodiment, aside from the configuration of the link unit. Therefore, the same reference numerals are given to the same parts as those already described in the first embodiment, and duplicate description is omitted.

Figure 8:
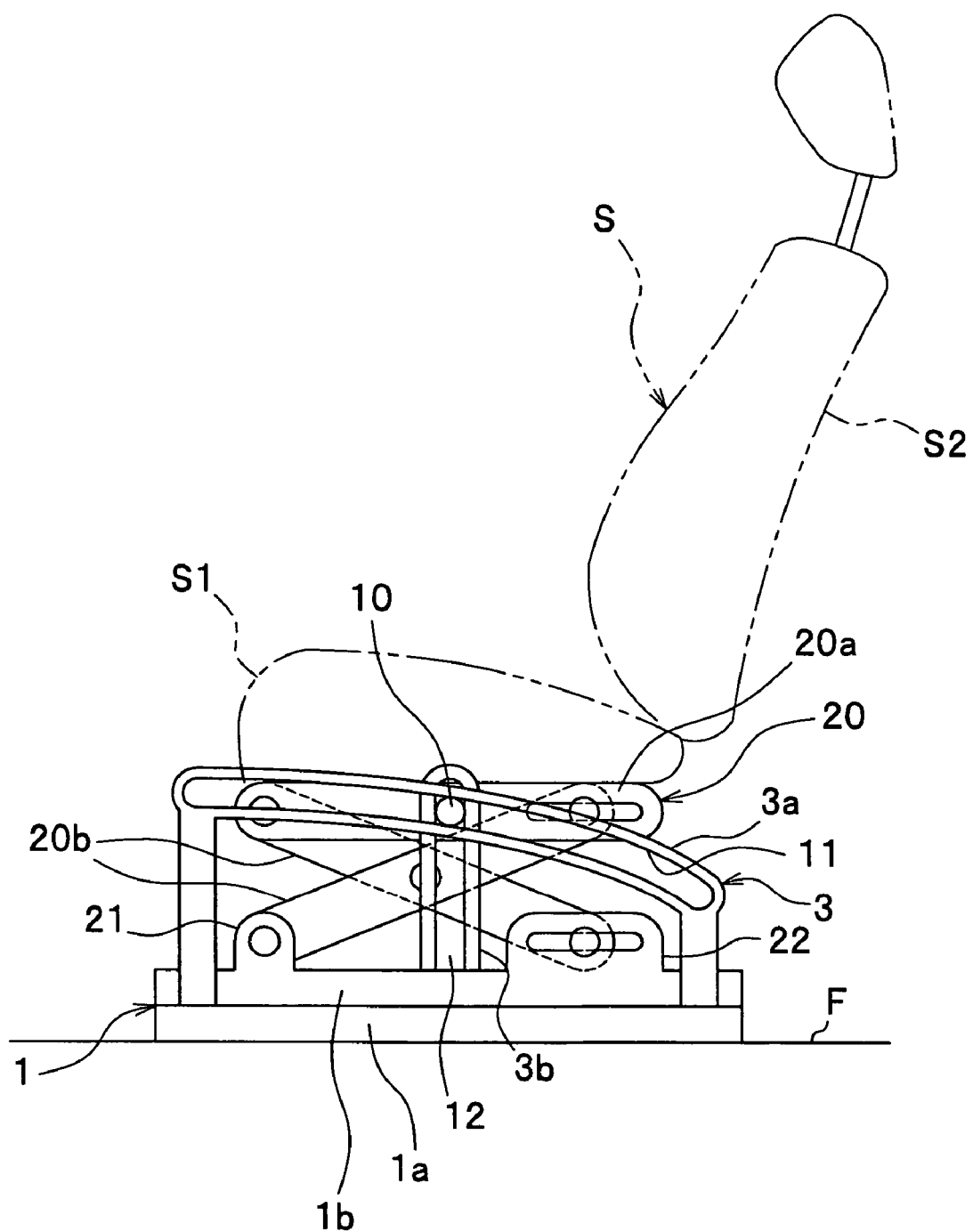
FIG. 8 is a side view depicting a link unit of a seat apparatus for vehicles according to a second embodiment of the present invention.

Referring to FIG. 8, a link unit 20 includes a pair of upper links 20a and 20a and a pair of cross links 20b and 20b. The upper links 20a and 20a are provided under the seat cushion S1 of the seat main body S. The cross-shaped cross link 20b fixes the upper link 20a over an area between hinge portions 21 and 22. In this way, the height of the upper link 20a is variable. The link unit 20 allows the seat cushion S1 to stay parallel to the floor F, and its height is variable.

The link unit 20 has the pin members 10 and 10 on the upper links 20a, and each pin member 10 is inserted into and engages with both the lateral guide aperture 11 of the lateral guide member 3a and the vertical guide aperture 12 of the vertical guide member 3b. In addition, although not shown, the upper link 20a and the cross link 20b are coupled to each other by a link member such as a stick member or pipe member in order to move in relation to one another.

[Adjusting Orbit]

Now, a brief description will be given below, of a method for setting the adjusting orbit M which is created by the lateral guide aperture 11 of the lateral guide member 3a.

The adjusting orbit M is created based on the heights of the viewpoint of a driver (see FIG. 10) and of the hip points P1, P2 and P3 of the driver. All the heights are determined on the condition that the driver's heels are fixed in front of the pedals N. Specifically, referring to FIG. 9, first, the heel position and the viewpoint are fixed. Second, the hip points P1, P2 and P3 are determined by using three drivers of different builds. Finally, the adjusting orbit M is set by connecting these hip points. In this case, the hip points P1, P2 and P3 corresponds to a driver of large, medium and small builds, respectively.

To determine the hip points P1, P2 and P3, individual persons of large, medium and small builds are extracted from a statistical population with a narrow distribution that shows a human build.

The person of a large build may be selected from a person having the maximum build of 95 percentile of the distribution, a person having an average build in the biggest group when the statistical population is divided into three, or a person having a predetermined build such as a length of 1795 mm.

The person of a small build may be selected from a person having the maximum built of 5 percentile of the distribution, a person of the smallest build in the biggest group when the statistical population is divided into three, or a person having a predetermined value such as a length of 1545 mm.

The person having a medium build may be a person having an average or median build in the distribution.

In this way, the hip points P1, P2 and P3 are determined.

Figure 10:
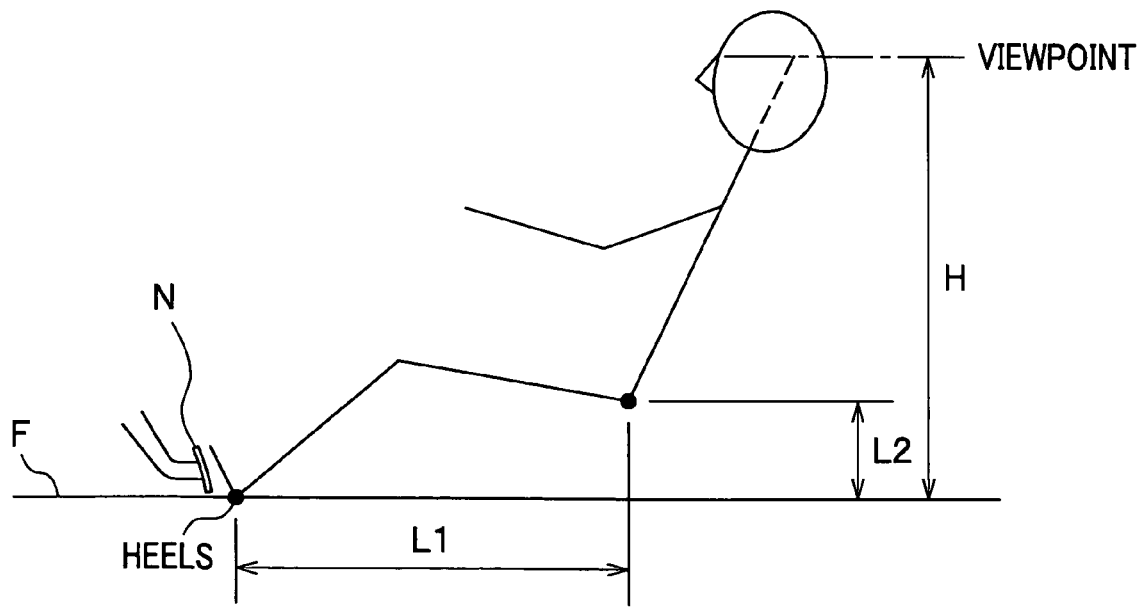
FIG. 10 is a view for explaining the relationship between the hip point and the build.
Figure 11:
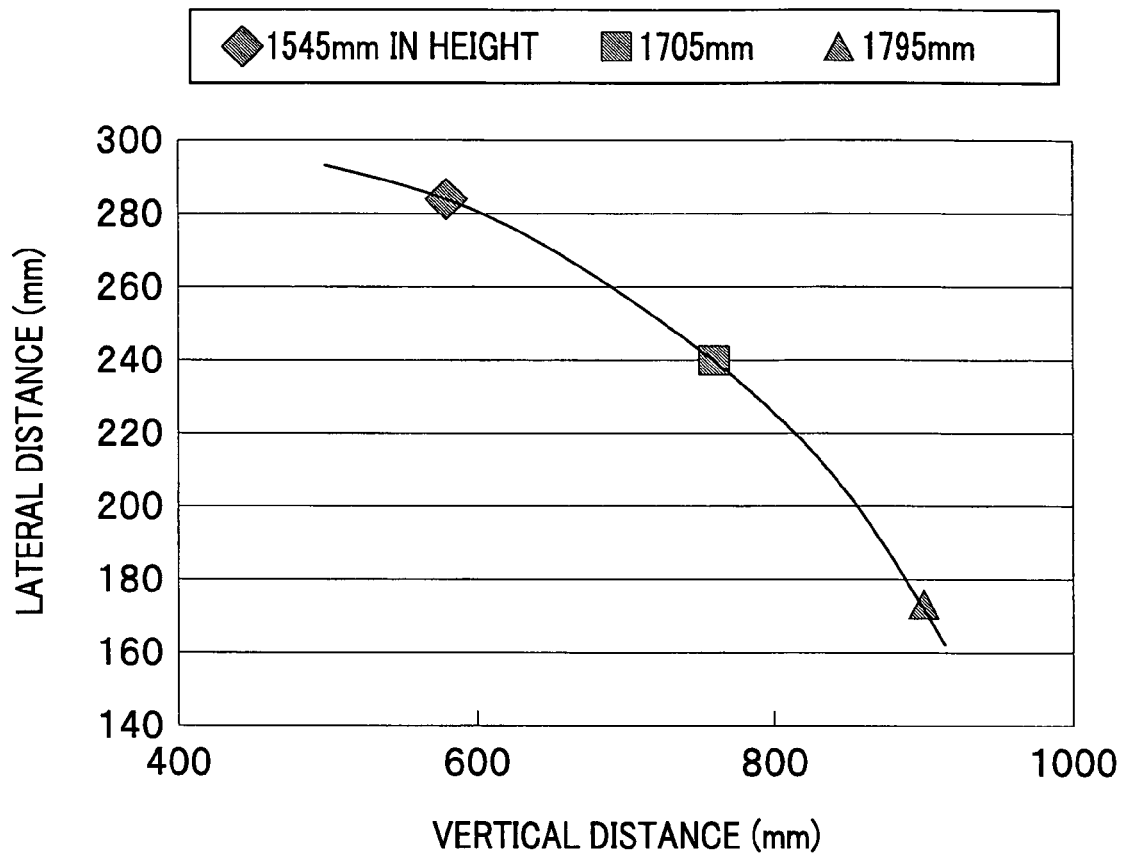
FIG. 11 is a graph showing the hip points, which are determined based on the lateral and vertical distances between the heel and the viewpoint of a driver.

Referring to FIGS. 10 and 11, the hip points P1, P2 and P3 have been determined. The hip point is represented by lateral and vertical distances L1 and L2 between the heel position and the hip position of a driver. Based on the determined hip points, the adjusting orbit M is set. In this embodiment, the length of a person of large, small and medium is assumed to 1795 mm, 1545 mm and 1705 mm, respectively. Furthermore, a vertical length from a floor to a viewpoint is assumed to 1040 mm.

If a curved line formed by connecting the hip points P1, P2 and P3 of FIG. 11 is approximated by a quadric curve, then an obtained equation is given:

$$y = -0.0008x^2 + 0.8013x + 80.74$$

where the heel position is an origin, an x axis indicates the lateral distance, and a y axis indicates the vertical distance.

Figure 12:
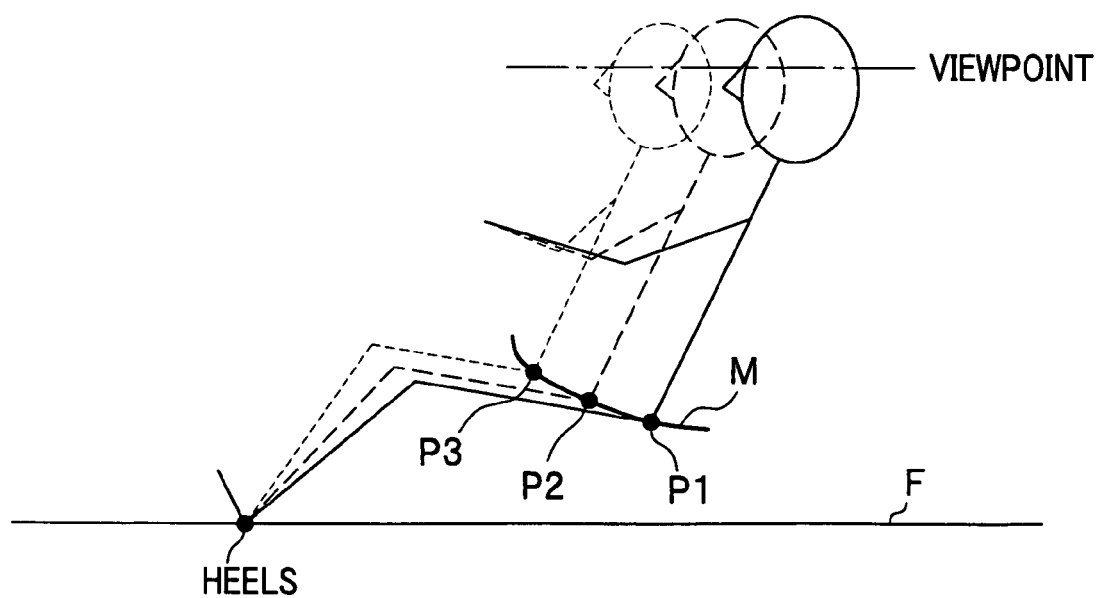
FIG. 12 is a view for explaining a curved shape of an adjusting orbit traced by the build and the hip point of a driver.

As shown in FIG. 12, the shape of the adjusting orbit M may be reversed.

In the above-described embodiments, the guide unit 3 of the seat apparatus A includes two types of components, that is, the lateral guide members 3a and 3a and the vertical guide members 3b and 3b. However, the vertical guide members 3b and 3b can be omitted depending on the configuration of the link unit. For example, if the link unit 20 of FIG. 8 may be used, then the vertical guide members 3b and 3b may be omitted.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A seat apparatus for a vehicle comprising:
    a support portion configured to support a seat main body being placed on a floor and behind pedals in the vehicle in such a way that the seat main body is movable forward, backward, upward and downward and that the seat main body is made higher in height as the seat main body moves forward; and
    an adjustment portion configured to adjust adjusting a position of the seat main body forward, backward, upward and downward in a predetermined adjusting orbit having a curved shape, while maintaining an angular orientation of the seat main body so that the position fits different builds of drivers,
    wherein the adjusting orbit is determined based on hip points of the drivers, and the hip points are set on the condition that a viewpoint and heels of the drivers are fixed.

2. The seat apparatus according to claim 1, wherein the support portion comprises
    a link unit configured to support the seat main body parallel to the floor in such a way that the seat main body is movable upward and downward, and
    a seat slide unit configured to support the seat main body through the link unit in such a way that the seat main body is movable forward and backward; and
    wherein the adjustment portion comprises a guide unit configured to move the seat main body in the adjusting orbit by varying a height of the link unit in response to the movement of the seat slide unit.

3. The seat apparatus according to claim 2,
    wherein the guide unit comprises at least one aperture being formed to have a shape of the adjusting orbit, and
    wherein the link unit comprises at least one guide member engaging with the at least one aperture and sliding within the at least one aperture.

4. The seat apparatus according to claim 2,
    wherein the seat slide unit comprises a vehicle body fixture unit and a movable unit, the vehicle body fixture unit being secured to the floor, the movable unit being slidably attached to the vehicle body fixture unit.

5. The seat apparatus according to claim 4,
    wherein the vehicle body fixture unit comprises a pair of lower rails, and the movable unit comprises a pair of upper rails.

6. The seat apparatus according to claim 2,
    wherein the seat slide unit further comprises a motor, a power source and a switch, and the seat slide unit is configured to move the seat main body by the motor in response to an operation of the switch.

7. A vehicle, comprising: a floor; and
    a seat comprising a support portion configured to support a seat main body being placed on the floor and behind pedals in the vehicle in such a way that the seat main body is movable forward, backward, upward and downward and that the seat main body is made higher in height as the seat main body moves forward; and
    an adjustment portion configured to
    adjust a position of the seal main body forward, backward, upward and downward in a predetermined adjusting orbit having a curved shape, while maintaining an angular orientation of the seat main body so that the position fits different builds of drivers,
    wherein the adjusting orbit is determined based on hip points of the drivers, and the hip points are set on the condition that a viewpoint and heels of the drivers are fixed.

8. A vehicle, comprising:
    a seat configured to
        support a seat main body being placed on a floor and behind pedals in the vehicle in such a way that the seat main body is movable forward, backward, upward and downward and that the seat main body is made higher in height as the seat main body moves forward; and
        adjust a position of the seat main body forward, backward, upward and downward in a predetermined adjusting orbit having a curved shape, so that the position fits different builds of drivers;
    wherein the adjusting orbit is determined based on hip points of the drivers, and the hip points are set on the condition that a viewpoint and heels of the drivers are fixed,
    the seat comprising
        a link unit configured to support the seat main body parallel to the floor in such a way that the seat main body is movable upward and downward,
        a seat slide unit configured to support the seat main body through the link unit in such a way that the seat main body is movable forward and backward, and
        a guide unit configured to move the seat main body in the adjusting orbit by varying a height of the link unit in response to the movement of the seat slide unit.

* * * * *